United States Patent [19]
Roodvoets

[11] 3,907,435
[45] Sept. 23, 1975

[54] LIGHT BEAM ALIGNMENT TARGET AND METHOD

[75] Inventor: Roger J. Roodvoets, Grand Rapids, Mich.

[73] Assignee: Laser Alignment, Inc., Grand Rapids, Mich.

[22] Filed: Sept. 29, 1972

[21] Appl. No.: 293,312

[52] U.S. Cl. ............... 356/153; 356/138; 356/152; 250/578; 250/208; 33/286; 340/324 M
[51] Int. Cl.² .......................................... G01B 11/26
[58] Field of Search .......... 356/138, 153, 172, 152; 331/94.5 A; 250/578, 208, 213; 340/324 M, 380; 33/1 H, 286; 61/72.1

[56] References Cited
UNITED STATES PATENTS

| | | |
|---|---|---|
| 3,279,070 | 10/1966 | Blount et al. ..................... 33/1 H X |
| 3,603,691 | 9/1971 | Hamilton ...................... 356/172 X |
| 3,631,601 | 1/1972 | McNulty ........................ 356/153 X |

OTHER PUBLICATIONS

"Laser Beam Guides Tunnel Borer," May 1966, p. 116, Coal Agr.

"The Laser in Construction: Lite-Line Guides A Pipeline" by Fouss, et al., Laser Focus, Dec. 1968, pp. 31–40.

Primary Examiner—Ronald L. Wibert
Assistant Examiner—Paul K. Godwin
Attorney, Agent, or Firm—Price, Heneveld, Huizenga & Cooper

[57] ABSTRACT

A target for alignment of pipes and the like about a beam of light projected along a predetermined axis. The target includes a light-sensing means positioned at one end of the pipe to intercept and detect the light beam. The sensing means through suitable electronic circuitry, provides an input to a readout indicator. In a preferred embodiment, the indicator includes a plurality of incandescent bulbs arranged in a pattern corresponding to the pattern of the sensing elements. Movement of the pipe and target about the light beam is detected by the sensors and visually displayed by the indicator. In an alternate embodiment, the indicator provides an audible signal to indicate the relative position of the light source with the sensors.

2 Claims, 9 Drawing Figures

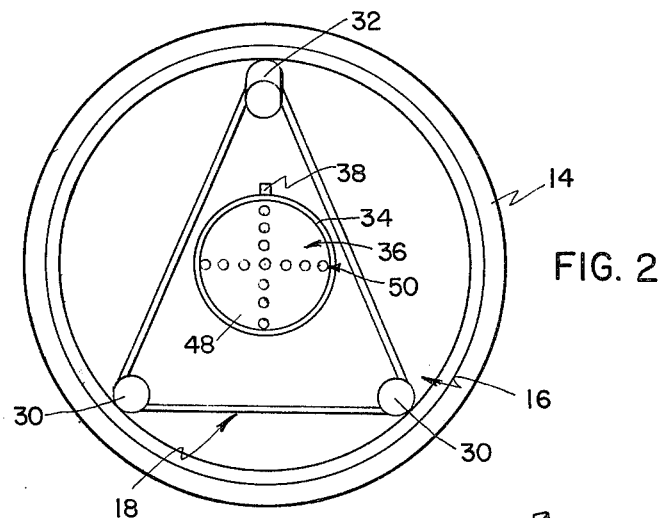
FIG. 2
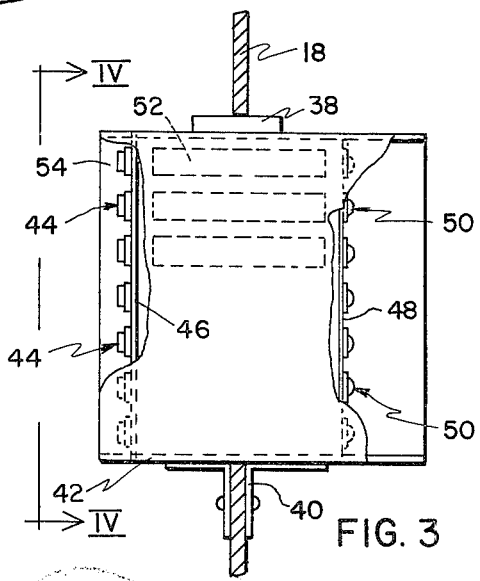
FIG. 3
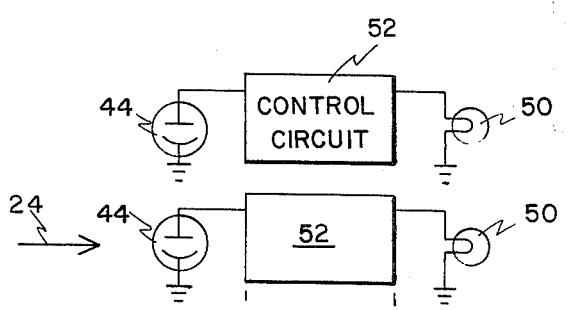
FIG. 6
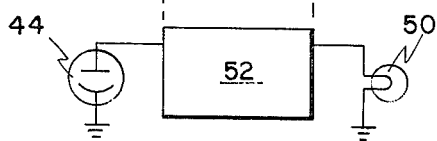

LIGHT BEAM ALIGNMENT TARGET AND METHOD

BACKGROUND OF THE INVENTION

In the art of aligning pipes and like objects utilizing a source of light for projecting a beam along a predetermined axis, an opaque or translucent target is positioned at one end of the pipe to intercept the light beam. A spot of light appearing on the target is used as a reference while the pipe and target are moved into position such that the spot of light assumes a predetermined position with respect to a cross marker or other indicator on the target. Methods and apparatus which utilize such a system are exemplified, for example, in U.S. Pat. No. 3,116,557 entitled METHOD AND MEANS FOR LAYING SEWER PIPE, issued Jan. 7, 1964, to J. R. Trice, Jr., and U.S. Pat. No. 3,279,070 entitled AUTOMATIC GRADE LIGHT, issued Oct. 18, 1966, to G. R. Blount et al.

The systems described in these prior art patents have significantly increased the rate and accuracy at which a pipeline can be laid. Unfortunately, however, under conditions of high ambient light, the spot of light projected on the target through the opaque screen is difficult to detect. In addition, it is required that a workman be in the excavation where the pipe is laid to detect the spot and to physically move the pipe into place. When working with large diameter pipes which must be positioned by heavy construction machinery, hand or other signals must be given by the workman to the machinery operator to guide the pipe into position.

SUMMARY OF THE INVENTION

The present invention relates to a target apparatus positioned within the pipe which electronically senses the position of the pipe and target with respect to the projected light beam. A light-sensing means is arranged on the target structure to intercept the projected light beam. In response to the sensing of the light beam, an indicator provides a visual indication of the position of the light beam with respect to the sensors.

In a preferred embodiment, the light sensing means includes a plurality of light-sensing elements arranged in a predetermined pattern on the target structure. The indicator responsive to sensing of the light beam has a plurality of individual indicating elements arranged in a pattern corresponding to the pattern of the light-sensing elements.

Within another aspect of the invention, an audible indicating device is provided which responds to signals from the sensors to produce an audible tone signal. A different tone signal is provided in response to impingement of the light source on sensors located about various portions of the target pattern.

Preferably, a pulsed light beam is projected for detection by the light-sensing means. Accordingly, the circuitry associated therewith is responsive only to changes in light level such as is generated by a pulsed light source. Such an arrangement permits the use of more stable, less expensive AC circuitry that does not require correction to prevent or eliminate response to ambient light such as sunlight.

The indicators either visual or audible are not affected by ambient lighting conditions and may be used in virtually any environment. In one of the aspects of the invention, the sensor and indicator are formed as an integral unit such that the alignment readings are obtained and displayed directly at the end of the pipe. In another aspect of the invention, the indicator is located remotely from the detector as, for example, in the cab of power machinery utilized to move large diameter pipe sections into position.

Accordingly, it is a primary object of the present invention to provide an electronic target apparatus for rapid and accurate alignment to a light beam projected along a predetermined axis.

It is another object of the invention to provide an electronic target and readout mechanism for alignment purposes which is not affected by ambient lighting conditions.

It is another object of the invention to provide a light beam intercepting target having light-sensing elements mounted thereon.

It is yet another object of the invention to provide a target apparatus for light beam alignment systems in which an indication of the light beam impingement upon the target may be remotely located from the target.

These and other important features, objects, and advantages of the invention will become readily understood by those skilled in the art upon reading the following description and with reference to the accompanying drawings illustrating a preferred embodiment of the invention.

BRIEF DESCRIPTION OF THE DRAWINGS

The invention will now be described with reference to the accompanying drawings in which:

FIG. 2 is an end view of the pipe and target section illustrated in FIG. 1 as viewed along the plane II—II of FIG. 1;

FIG. 3 is a view partially in cross section illustrating the target apparatus of the present invention;

FIG. 6 is a block diagram illustrating the interconnection between the sensing elements and indicators utilized in the present invention;

DESCRIPTION OF THE PREFERRED EMBODIMENT

Figure 1:
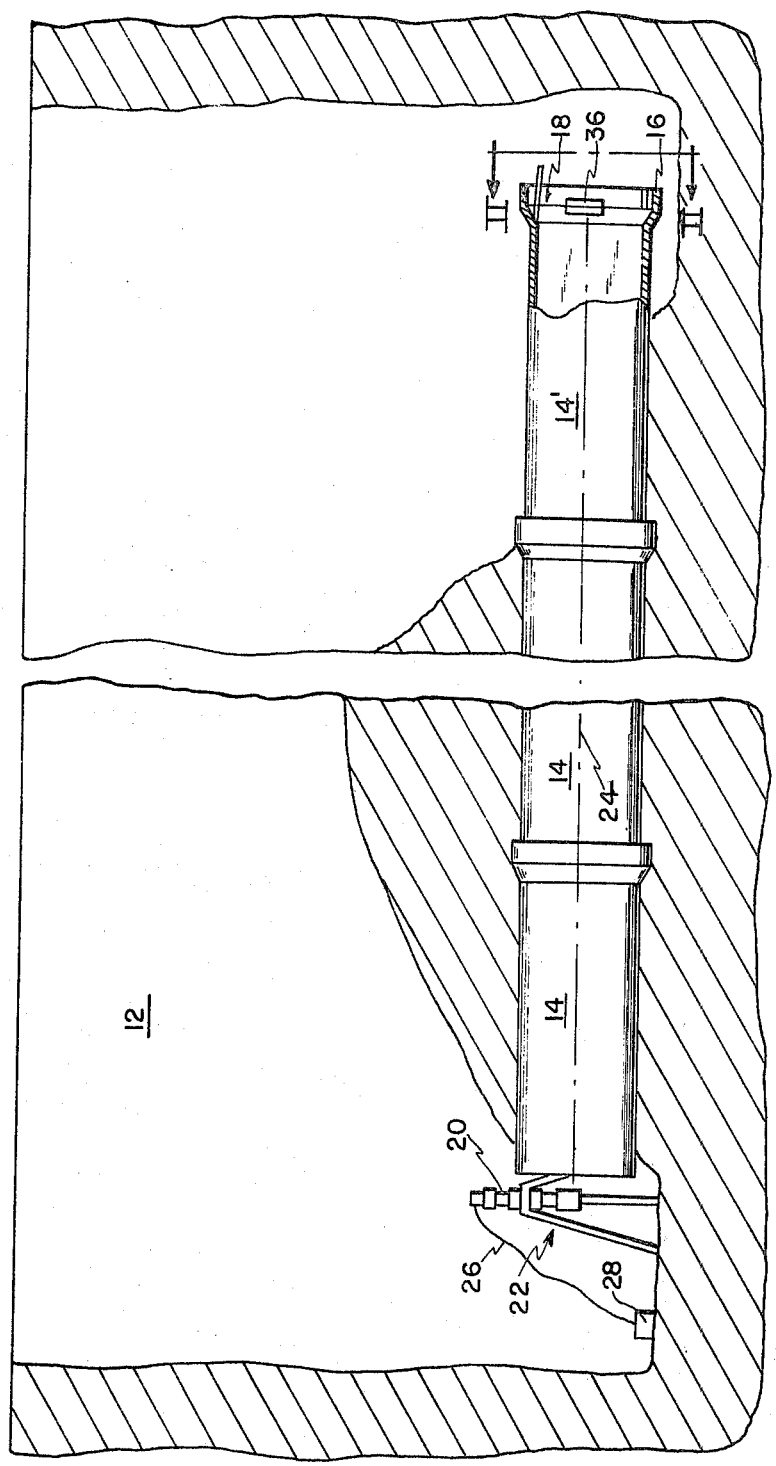
FIG. 1 is a side elevational view partially in cross section illustrating the method of the invention.

Referring now to the drawings, and particularly to FIGS. 1 and 2, there is shown a trench or excavated cavity in the earth 12 having a plurality of aligned pipes 14 joined end to end. A target support structure 18 is positioned within the bell end 16 of the last pipe 14' in the line. A light beam generator 20, preferably a laser generator for producing a collimated beam of light, is supported in any convenient manner, as on a tripod 22 for producing and directing a collimated beam of laser light 24 through the pipe along a predetermined axis. The laser generator 20 is preferably of a type commonly commercially available and preferably produces a pulsed output. The pulsed output may be internally, electronically generated within the laser generator or may be accomplished by an external rotating shutter or mechanical chopper, the details and operation of which are well-known to those skilled in the art. Lead wires 26 extending from the laser generator 20 are connected to a suitable power supply 28.

The target support member 18 is generally triangular in shape and conforms generally to the inner diameter of the pipe 14. The support 18 includes a pair of lower mounting pads 30 (FIG. 2) and an upper spring-loaded mounting handle 32 to wedge and hold the support 18 in the inner diameter of the pipe. An opening 34 in the center of support 18 is provided to receive a light beam detector or target assembly generally indicated by the numeral 36. The target or detector 36 is preferably cylindrical in shape and is adapted for mounting in the opening 34 in the center of the target support 18. A key 38 may be fixed on the target assembly 36 to slide in a matching keyway formed about the opening in the target support 18 to insure accurate alignment therein.

The target 36 is arranged to be removably supported within the support 18 such that differing size support members may be utilized in different size pipes. It being understood that the differing size support structures 18 having provision in their central portion to receive the actual target structure 36. The target 36 may be further supported within the structure 18 by means of an annular bracket 40 (FIG. 3) partially surrounding the opening 34 and extending outwardly therefrom to support the outer casing 42 of the target assembly.

Figure 4:
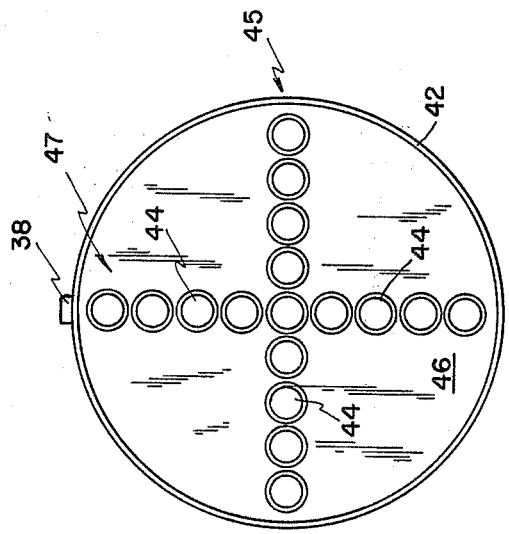
FIG. 4 is an end view of the pattern of the sensing elements taken along the plane IV—IV of FIG. 3.

Referring now additionally to FIGS. 3 and 4, the structure of the target assembly 36 will be described in greater detail. The target assembly is formed in a cylindrical housing 42 and includes a plurality of light-sensing elements 44 arranged in a predetermined pattern at one end thereof. The sensing elements are preferably a photoconducting cell in which its internal circuit resistance changes upon stimulation by a light source. The particular sensing element utilized in the illustrated embodiment utilizes a sensing element housed in a case having a clear glass face to admit light but to protect the element from humidity, moisture, dirt and the like. The plurality of light-sensing elements 44 are mounted in a predetermined pattern on a plate 46 fixed within the casing 42.

The pattern of the sensing elements 44 on the plate 46 may be arranged as illustrated in FIG. 4, that is, having a horizontal row 45 and a vertical row 47, the intersection thereof being a preferred point of intersection with the light beam 24 when the pipe is in proper alignment.

The opposite end of the casing 42 includes a second mounting plate 48 upon which are mounted a plurality of indicator lamps 50. The indicating lamps are arranged in a pattern on the plate 48 to correspond exactly to the pattern of the light-sensing elements 44 on the opposite side of the casing 42, i.e., in a horizontal and vertical row. If desired, the vertical row may include lamps of one color while a different color is utilized for the horizontal row. A third color or even a clear bulb may be utilized for the central intersecting lamp to assist the operator in his positioning of the pipe about the predetermined axis and to indicate perfect alignment.

The central portion of the casing 42 between the plates 46 and 48 houses a suitable control circuit means 52 to convert the sensed light beam 24 at a sensor 44 to a visual output by illumination of a corresponding indicator bulb 50.

Referring to FIG. 6, a basic block diagram is illustrated showing the interconnection between the sensing elements 44 and the indicators 50. The sensing elements 44 are connected through the control circuits 52 which include conventional transistor switching means which respond to signals from the sensing elements 44 to activate the indicator bulbs 50 in a desired manner.

Figure 7:
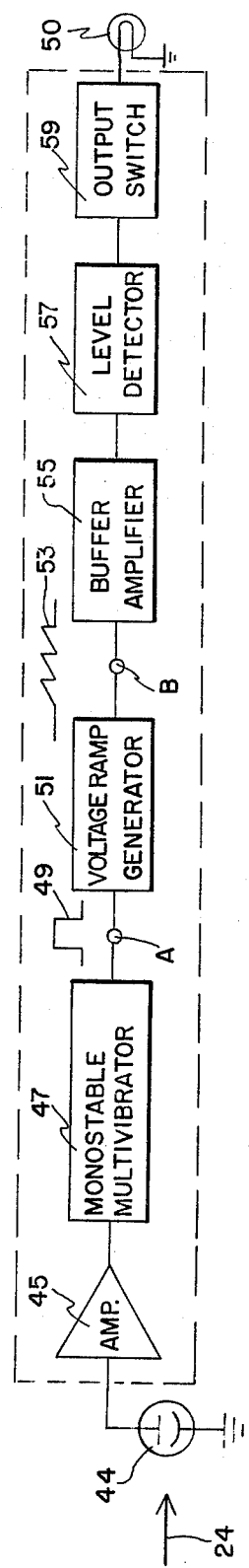
FIG. 7 is a block diagram illustrating the control circuit shown in FIG. 6.

The electrical control circuit 52 for operating the aligning system is shown in block diagram form in FIG. 7. Referring now to the figure, it is seen that the electrical control circuit comprises separate channels indicated generally in the figure by a series of block diagram circuits. Identical channels are utilized for each receiver-detector combination. Thus, only one channel operation is described. A photo-detector 44 is positioned on the target and receives pulsed light from the laser light 20 source when the target is positioned in the path of the laser beam 24 such that the light impinges on photo-detector 44. The electrical output signal from the photo-detector 44 is applied to a broad bandwith amplifier 45 which amplifies the received pulse signal and applies it to a mono-stable multivibrator 47. The signal at output terminal A of the multivibrator is shown by the waveform 49 and comprises a constant width pulse having a pulse repetition rate related to the pulse repetition rate of the light pulses detected by detector 44. The pulses 49 from the multivibrator 47 are then applied to a voltage ramp generator 51. Generator 51 is comprised of a capacitor which is linearly charged through a high impedance from a voltage source and can be quickly discharged by a silicon controlled rectifier (SCR) having a gate terminal alternating current coupled to output terminal A of the multivibrator 47. The circuit details of generator 51 are not shown in the figure. Thus, with each received pulse 49, the capacitor in generator 51 is discharged thereby providing a voltage ramp output waveform 53 at output terminal B of the generator. The generator signal 53 is applied to a buffer amplifier 55 which isolates the capacitor from a level detecting circuit 57. Circuit 57 can be, for example, a Schmitt trigger which operates to provide an output signal to the output switch circuit 59 only when the generator signals 53 have an amplitude below the threshold of the Schmitt trigger circuit.

When continuous ambient light is received, the output signal at terminal B of the generator will rise above the trigger level of the Schmitt trigger since the SCR is not fired, thereby causing the output signal from circuit 57 to change states and not supply an output signal to output switch 59. The same result occurs when no light is received. During the receipt of detected light pulses from the laser source, however, the Schmitt trigger will normally provide an output signal to the output switch 59 which is actuated thereby to provide an output signal applied to the indicators 50.

The mono-stable, multivibrator 47 supplies constant voltage constant time width trigger pulses to the gate of the SCR in generator 51 for consistent firing of the SCR independent of the pulse width of the signal supplied by the amplifier 45. The charging time constants of the ramp generator 51 are adjusted to result in a slow voltage rise at output terminal B. The time required for the discharge capacitor to charge to the turnoff threshold of the level detector 57 is much longer than the pulse signal 49 allowing a signal of sufficient duration to be applied to output switch 59 and thus to the indicator 50. This signal time extension permits the circuitry to be on long enough to fully illuminate the indicator 50 and also permits the indicator to operate in a continuous manner if the next input signal pulse is received by the photocell 44 before the voltage ramp generator 51 has reached the turnoff threshold of the level detector circuit 57.

Thus, the above-described electronic circuitry supplies a continuous readout display until such time as a change in display is required to denote a change of position of the target relative to the projected beam of light.

Referring again to FIG. 3, it will be noted that a front portion 54 of the casing 42 extends a slight distance outwardly from the plate 46 on which the sensing elements 44 are mounted. This extension of the casing serves to protect the clear faces of the sensing elements 44 through which the light beam passes during transport and storage of the target assembly 36. The rear portion 56 of the housing 42 also extends a slight distance outwardly from the plate 48 upon which the indicator lamps 50 are mounted. This similarly protects the lamps from damage and in addition, forms a hood about the indicator portion of the target such that in areas of high ambient light, a shadow is cast over the lamps 50 to aid in the visual reading thereof. If desired, transparent covers may be provided at the ends of the casing and the entire unit may be sealed to protect the component parts from the environment.

Figure 5:
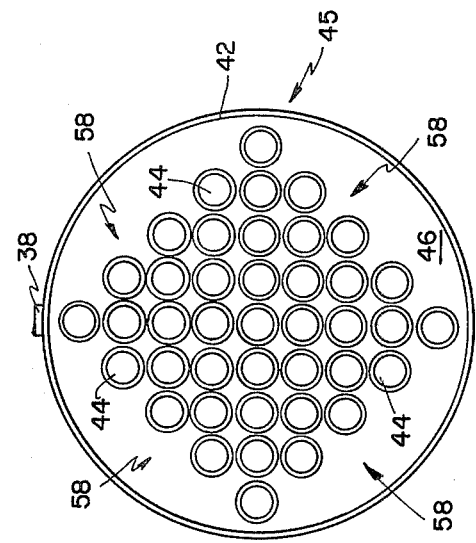
FIG. 5 is a view similar to FIG. 4 illustrating a modified target pattern.

The arrangement of the sensor target and indicator pattern may be varied as desired to suit a particular application. An alternate pattern arrangement is illustrated in FIG. 5 wherein, in addition to the horizontal row 45 and vertical row 47 of sensing elements 44 as illustrated in FIG. 4, each quadrant 58 of the target is also provided with additional similar sensing elements 44. In this embodiment, the operator will have the somewhat better "feel" for which side of the horizontal or vertical row the pipe is positioned with respect to the axis of the projected beam as he moves the pipe thereabout. The sensor pattern and the indicator pattern are, of course, identically arranged.

Figure 8:
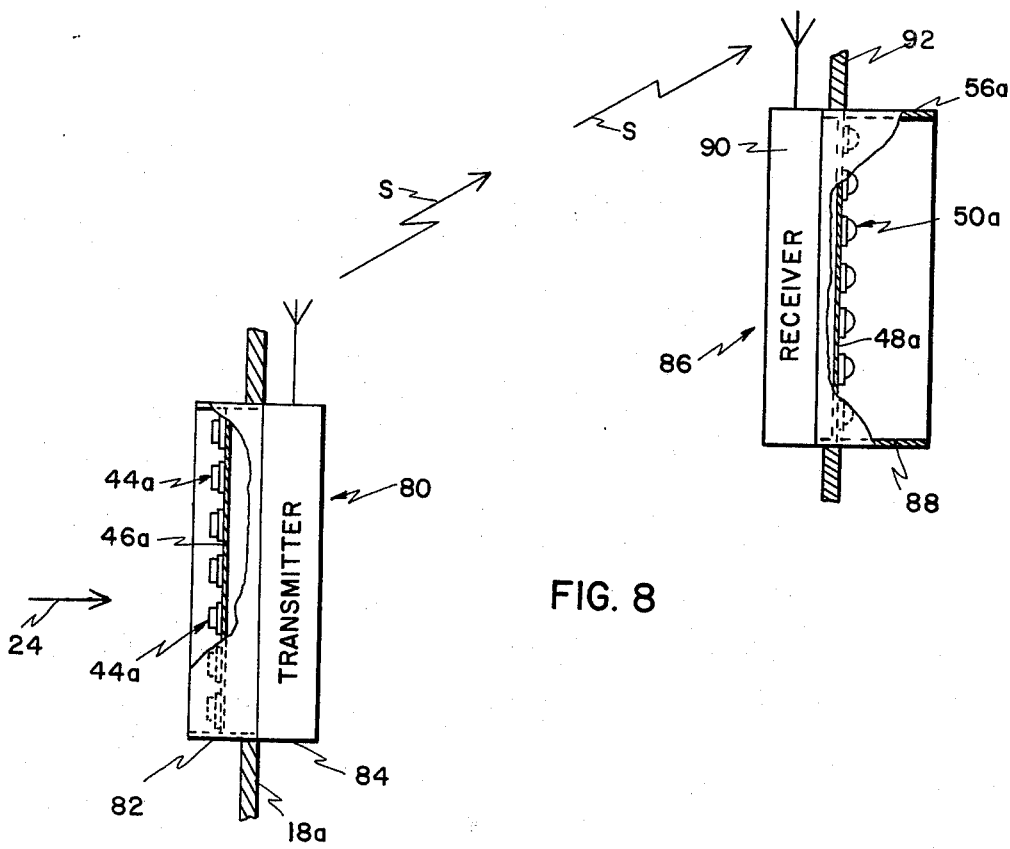
FIG. 8 illustrates a remote reading electronic target and display indicator.

An alternate embodiment having a remote reading indicator for the electronic target is illustrated in FIG. 8. In this embodiment, like parts are designated with like reference numerals bearing the suffix letter "a." In this embodiment, a separate sensor and indicator are provided. A light sensor and transmitter section 80 includes a plurality of sensing elements 44a mounted on a plate 46a and contained within a housing 82. Also included on the housing is a transmitter section 84 adapted to generate and transmit signals S representative of the particular sensing element 44a which has been energized by the light beam 24. The sensor-transmitter section 80 is adapted for mounting within the target support structure 18a in a manner as previously described in connection with FIG. 3.

An indicator and receiver section 86 includes a plurality of indicator bulbs 50a mounted on a plate 48a contained within a housing 88. Also included on the housing 88 is a receiver section 90 adapted to receive the signals S from the transmitter 84 and to selectively apply the signals to one of the indicator bulbs 50a representative of the sensing elements 44a energized by the light beam 24. The indicator and receiver assembly 86 may be mounted in a panel 92 at a location remote from the sensor and transmitter 80. This is particularly useful when handling large diameter pipes with heavy mechanical equipment so that the equipment operator will have a visual indication of the position of the pipe with respect to the reference beam 24. Any number of receivers and indicators 86 may be utilized with the single sensor and transmitter 80. In this manner, a workman equipped with a receiver-indicator may be positioned near the pipe while a nearby crane operator operating the equipment necessary to apply the forces necessary to move the pipe may be equipped with a similar receiver-indicator 86. In this manner, each of the workmen will have a visual indication of the progress of the pipe movement with respect to the transmitted beam 24.

Figure 9:
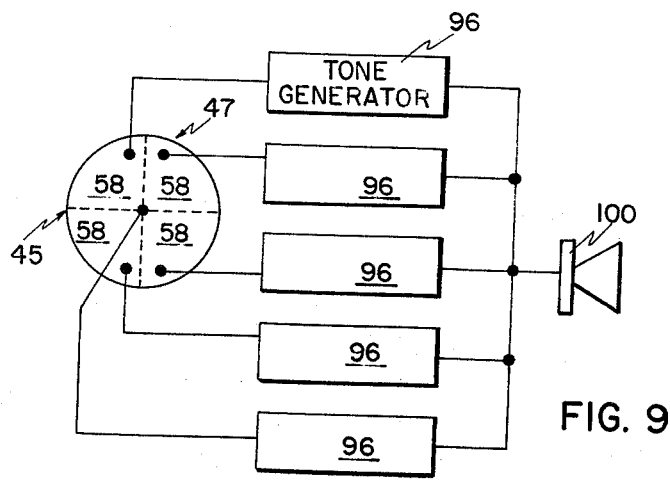
FIG. 9 is a block diagram illustrating an audible output indicator for use with the invention.

As schematically illustrated in the block diagram of FIG. 9, when an audible indicator system is utilized, each group of sensors in any given quadrant 58 of the target pattern are connected through suitable tone generators 96 to produce an audible output at an output device or speaker 100. Each tone generator produces a distinctive output signal so the operator, as he moves the pipe and target about the reference beam 24, is given an audible indication of the position of the light beam with respect to the sensors. Preferably, distinctive signals are provided to indicate the beam position above and below the horizontal reference line 45 and to the left or right of the vertical reference line 47. A special tone generator 98 is connected to the sensor 44 located at the intersection of the quadrants 58. This tone generator provides a special distinctive output signal at the speaker 100 to indicate when the light beam and target are in perfect alignment.

The tone generators and output speaker 100 may be connected integrally with the sensors and positioned at the end of the pipe. Alternately, as in the embodiment of FIG. 8, suitable transmitting and receiving electronics may be provided for remote operation.

Operation of the target structure in the alignment of pipes is identical in each of the embodiments shown. The laser is arranged to transmit the light beam 24 along a predetermined axis preferably through the inner diameter of the pipes. The target in its support 18 is positioned in the end of the last pipe section furthest removed from the laser generator to intercept the light beam 24. The light beam falls on one of the sensing elements 44 arranged in a predetermined pattern on the target to thereby create a signal which is applied to a corresponding indicator lamp 50. This, of course, indicates the position of the light beam 24 with respect to the target. The end of the pipe section in which the target is mounted is moved about the predetermined axis until such time as the indicator bulb 50 at the intersection of the horizontal and vertical rows of indicator bulbs 50 is illuminated. This indicates precise alignment of the pipe section with the light beam and the pipe section is fixed in place.

From the foregoing description and drawings, those skilled in the art will readily recognize that the present invention provides a unique electronic target and indicator assembly for precise alignment of pipes and the like to a predetermined reference point. The target is relatively simple in its construction yet provides an extremely accurate indication of the position of the pipe with respect to the light beam. The remote reading indicator construction lends itself to convenient placement and use in virtually any environment.

Those skilled in the art will immediately recognize the many additional advantages of the present invention. While a preferred embodiment has been illustrated and described in detail, it will be recognized that other embodiments and modifications of this invention incorporating the teachings hereof may be readily made in the light of this disclosure. Therefore, all modifications employing the principles of this invention are considered as included in the appended claims unless these claims by their language expressly state otherwise.

The embodiments of the invention in which an exclusive property or privilege is claimed are defined as follows:

1. A target system for use in aligning pipes to a pre-aligned collimated light beam which is projected axially of the pipe, said target comprising: electrically operated light beam sensing means positionable at an end of a pipe section to intercept said beam and adapted to generate a signal when in alignment with said beam; said light beam sensing means including a plurality of photosensing elements arranged in a predetermined pattern, said sensing elements being adapted to generate a signal in response to impingement of said beam on said sensing elements, and indicating means responsive to said signal from said sensing means to indicate alignment of said beam with said sensing means, said indicating means including tone generating means responsive to signals from said sensing means to produce an audible indication of the position of said sensing means with respect to said light beam.

2. The apparatus as defined in claim 1 wherein said light beam is pulsed and said photo-sensing elements are responsive only to said pulsed light beam.

* * * * *